March 27, 1962 T. B. CONSTANTINO 3,026,999
VISOR ATTACHED TISSUE PACK WITH INCORPORATED
TRASH RECEPTACLE
Filed Oct. 17, 1958 3 Sheets-Sheet 2
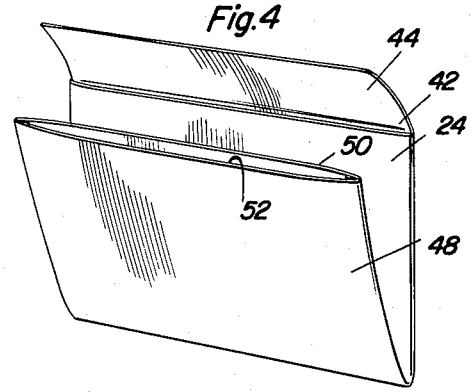
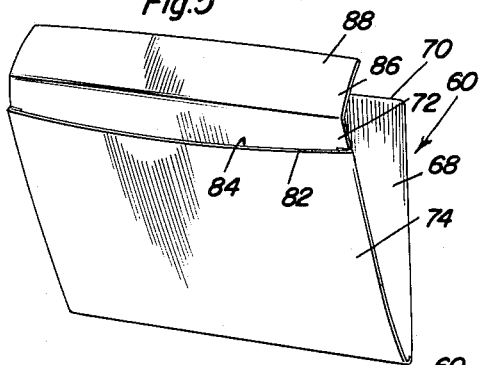
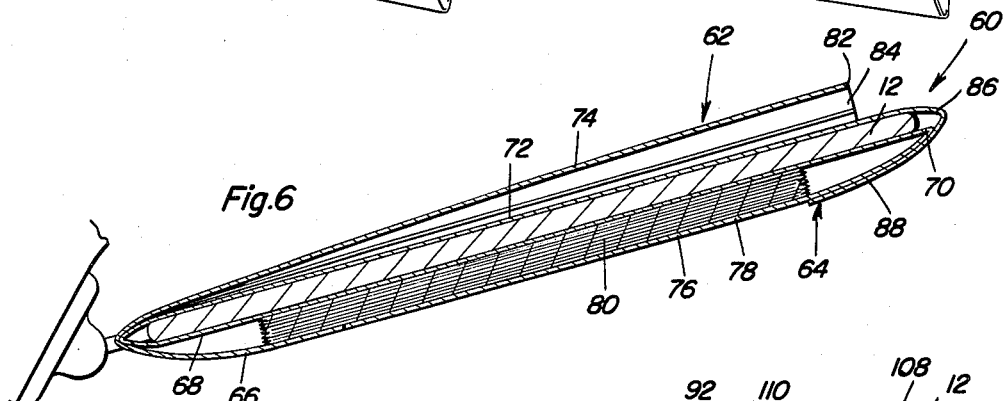
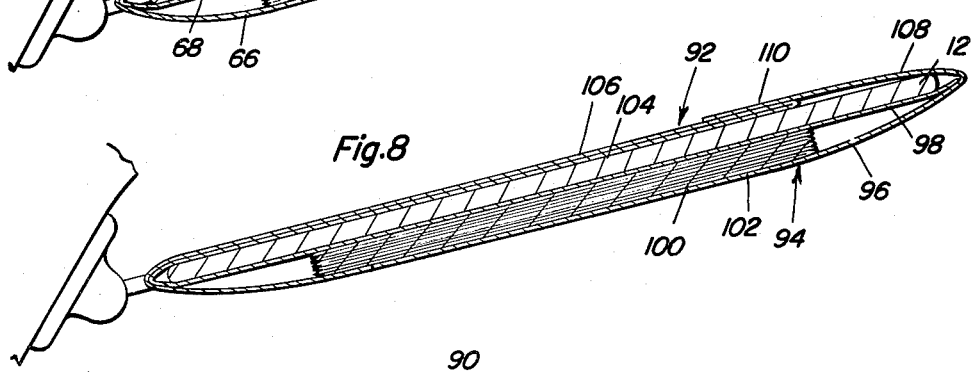
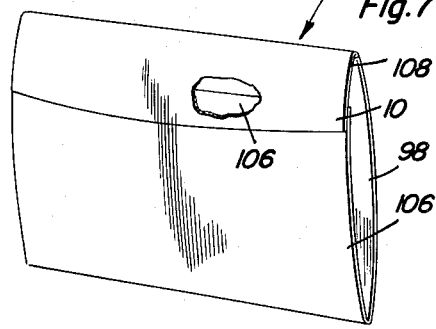
Thomas B. Constantino
INVENTOR.
BY *Clarence A. O'Brien
and Harvey B. Jackson*
Attorneys

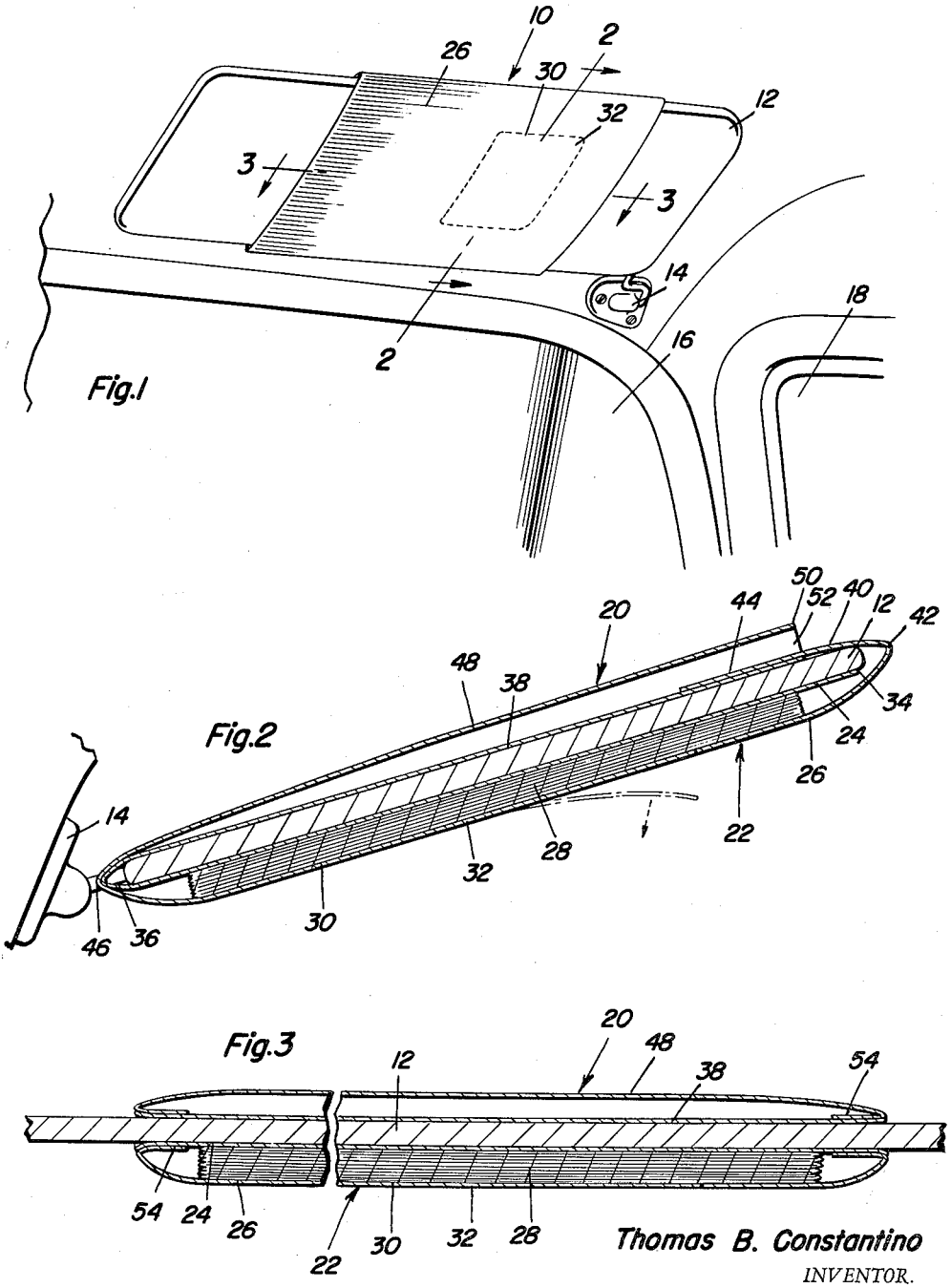

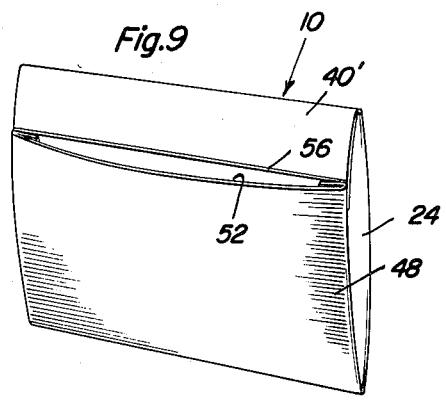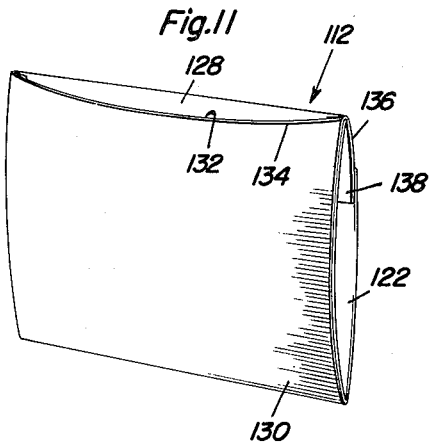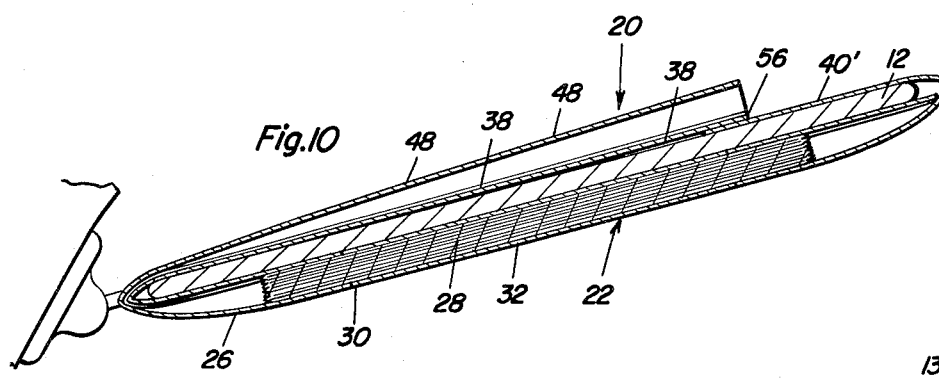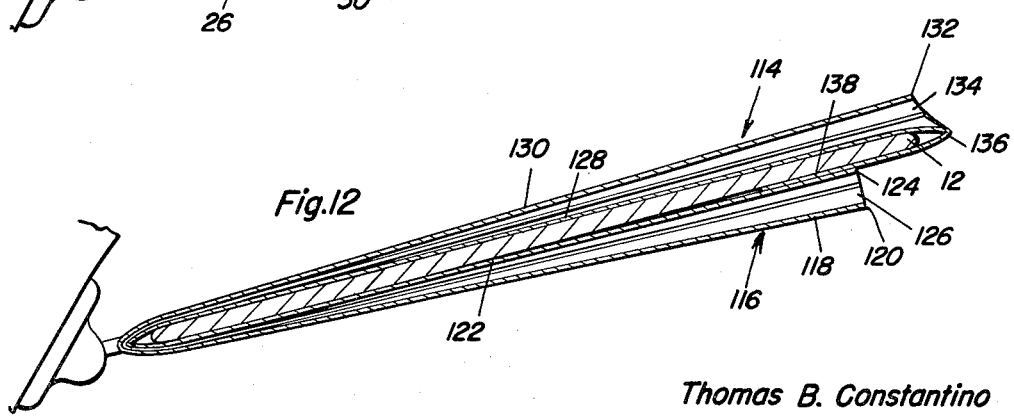

United States Patent Office 3,026,999
Patented Mar. 27, 1962

3,026,999
VISOR ATTACHED TISSUE PACK WITH INCORPORATED TRASH RECEPTACLE
Thomas B. Constantino, 10-12 Storrie St., Amsterdam, N.Y.
Filed Oct. 17, 1958, Ser. No. 767,834
8 Claims. (Cl. 206—19.5)

The present invention generally relates to an attachment for an automotive vehicle and more particularly to an attachment for a visor of such a vehicle normally located above the windshield for purposes of shielding the driver or passenger's eyes from the sun with the present attachment including a device for holding a supply of tissues so that the same will be readily accessible to the occupants of the vehicle.

In normal use of an automobile, there is quite frequently need for a paper tissue and it is thus desirable to have such tissues readily available so that the driver may obtain the same without excessive distraction from his driving duties. Recently, there have been many ordnances enacted to provide penalties for discharging refuse or the like from automotive vehicles. Thus, after providing for a supply of tissues, it is also desirable that some means be provided for disposing of such tissues since they are normally germ laden after use or otherwise undesirable. Therefore, it is the primary object of the present invention to provide a tissue pack having a trash receptacle incorporated therein for receiving used tissues and similar pieces of paper or the like with the entire assembly being mounted slidably in encircling relation to the visor of an automobile so that the supply of tissues will be readily available and also the trash receptacle will be readily available to the driver and occupants of an automotive vehicle.

Another object of the present invention is to provide a device in accordance with the preceding object in which the same is constructed of inexpensive paper material having adequate space for advertising indicia thereon whereby the same may be sold as a give-away item by the advertiser with the construction thereof rendering the same extremely inexpensive to manufacture, well adapted for its particular purposes and easy to use and assemble onto the visor.

Another object of the present invention is to provide a visor attached tissue pack with incorporated trash receptacle which is generally in the form of sleeve-like member which slides over the visor with the outer portion of the sleeve-like member having a supply of tissues mounted therein and the rear or inner portion of the sleeve-like member having the trash receptacle incorporated therein.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a partial perspective view of the interior of an automotive vehicle illustrating the visor and the tissue pack of the present invention mounted thereon;

FIGURE 2 is a sectional view taken substantially upon a plane passing along section line 2—2 of FIGURE 1, on an enlarged scale, and generally illustrating the structural relationship of the tissue pack with the visor;

FIGURE 3 is a sectional view taken substantially upon a plane passing along section line 3—3 of FIGURE 1, on an enlarged scale, further illustrating the construction of the visor pack and the relationship thereof to the visor;

FIGURE 4 is a rear perspective view of the construction of FIGURES 2 and 3 illustrating the same prior to the final step in the assembly thereof;

FIGURE 5 is a rear perspective view of a modified form of the invention showing the same just prior to the final step in the assembly thereof;

FIGURE 6 is a sectional view similar to FIGURE 2 but illustrating the structure of the form of the invention shown in FIGURE 5;

FIGURE 7 is a rear perspective view of another form of the invention with parts thereof broken away for illustrating the structure thereof;

FIGURE 8 is a sectional view similar to FIGURE 2 but illustrating the construction of the form of the invention shown in FIGURE 7;

FIGURE 9 is a rear perspective view of another form of the present invention;

FIGURE 10 is a sectional view similar to FIGURE 2 but illustrating the construction of the form of the invention shown in FIGURE 9;

FIGURE 11 is a rear perspective view of another form of the present invention; and FIGURE 12 is a sectional view similar to FIGURE 2 but illustrating the construction of the form of the invention shown in FIGURE 11.

Referring now specifically to the drawings, the form of the invention illustrated in FIGURES 1-4 includes the visor pack generally designated by the numeral 10 which is mounted on the usual sun visor 12 supported by a supporting bracket 14 for swinging movement about one edge thereof and generally about a vertical axis so that the sun visor may be swung downwardly behind a portion of the windshield 16 or over a portion of the side window 18. The visor 12 is of conventional construction and forms no part of the present invention except in its relationship to the visor pack 10. Further, the visor pack 10 may be mounted on either sun visor 12, that is the one disposed forwardly of the driver or the one disposed forwardly of the passenger such as illustrated in FIGURE 1. Throughout the drawings, the numeral 12 designates the sun visor and the visor may be of any conventional or suitable construction such as conventionally employed in passenger carrying automotive vehicles with it being necessary that one end edge of the visor 12 be free so that the sleeve-like visor pack 10 may be slid onto and off of the visor 12 by longitudinal sliding movement.

The visor pack 10 is preferably constructed of paper or similar inexpensive and light weight material which lends itself to receiving printed material so that advertising indicia and instructive indicia may be provided on the device. Generally, the visor pack is divided into two separate parts including an inner portion generally designated by the numeral 20 and an outer portion generally designated by the numeral 22. The outer portion 22 is disposed on the surface of the visor 12 which faces the passenger or driver while the inner portion 20 faces the roof of the automotive vehicle. The outer portion 22 includes an inner panel 24 and an outer panel 26 receiving a supply of folded tissues 28 therebetween. The tissues 28 may be of any conventional construction and are so folded and interengaged that a pull on the outermost tissue for removing the same will pull a portion of the next adjacent tissue outwardly through an opening in the outer panel 26. The opening is defined by a peripheral line of perforations 30 which includes a removable panel 32 whereby removal of the panel 32 will form an opening for sequential removal of the tissues 28. As shown in FIGURE 1, the area of the opening is disposed generally to one side of the panel 26 thereby leaving sufficient area for advertising indicia or the like. One end edge of the inner panel 24 is free as designated by the numeral 34 and the other end edge thereof is reversely bent as indicated by the numeral 36 and continues and forms a part of the rear portion 20 and constitutes an inner panel 38 of the rear portion 20. One end of the outer panel 26 is provided with an elongated extension 40 which extends beyond the edge of the sun visor 12 and is provided with a reverse bend 42 with the free end edge thereof being engaged with the outer surface of the inner panel 38 and adhesively secured thereto with the free edge of the front panel 26 secured to the inner panel 38 being designated by the numeral 44. The other end of the outer panel 36 is reversely folded as indicated by the numeral 46 and continues around and forms an outer panel 48 for the rear portion 20 which terminates in a free end edge 50 thus providing an entrance opening 52 through the area between the panels 38 and 48. The entrance opening 52 provides a receptacle for used tissues while removal of the closure panel 32 provides access to the supply of tissues 28. The side edges of the outermost panels 26 and 48 are inturned as indicated by the numeral 54 and are engaged with the corresponding inner panel by adhesive or the like. Thus, the device is quite similar in construction to a generally flat paper bag which has the bottom closing structure omitted for forming the entrance opening 52 and which has the normal closure flap formed by the extension 40 secured to the inner surface of the inner panel 38 of the rear portion 20. Suitably adhesive is used for this purpose and also for the purpose of securing the inturned edges 54 of the panels 48 and 26 to the panels 38 and 24 as clearly shown in FIGURE 3. When the device is so formed, the various paper panels are folded into engagement with each other thereby forming a very compact and neat package which may be easily packed for transportation in a relatively small space which has adequate space for indicia for advertising purposes or for any other purposes desired and the same may be decorated by any of the well known printing processes in such a manner that the same will be highly attractive and desirable.

Referring now specifically to FIGURES 9 and 10 of the drawings, the same general construction is used and the same reference numerals are applied. In this construction, the extension 40′ extends under and engages the surface of the inner panel 38 which is disposed against or adjacent to the visor 12 whereby the free end edge 56 of the inner panel 38 on the rear portion 20 is exposed thus providing the complete opening 52 available for insertion of used tissues. Other than the orientation of the extension or flap 40′ in relation to the inner panel 38, the construction is the same. Suitable adhesive is also applied for securing the extension 40′ to the interior surface of the inner panel 38.

FIGURES 5 and 6 illustrate another form of the invention designated generally by the numeral 60 including an inner portion 62 and an outer portion 64. The outer portion 64 includes an outer panel 66 and an inner panel 68 joined together at the upper or free edge of the visor 12 as indicated by the numeral 70. The other ends of the panels 66 and 68 are reversely bent and form inner and outer panels 72 and 74 respectively of the rear portion 62. The outer panel 66 is provided with the removable closure 76 defined by the perforated line 78 for receiving the supply of tissues 80 and whereby the same may be removed. The free end of the panel 74 designated by the numeral 82 is disposed inwardly of the free edge of the visor 12 thus forming a pocket having an entrance opening 84 for receiving used tissues or the like. The inner rear panel 72 is provided with an extension panel 86 reversely folded and extending around the free edge of the visor 12 and secured to the upper edge or surface of the outer panel 66 with this portion of the extension 86 being designated by the numeral 88 whereby suitable adhesive may be employed for securing the same in assembled position. In this construction, a flattened paper bag has been employed with only the positioning of the adhesive reorientated on the closure flap or extension 86. If desired, the flap 86 could extend against the inner surface of the inner panel 68 thus leaving the adhesive coating in the usual position on the closure flap 86.

FIGURES 7 and 8 illustrate another form of the visor pack generally designated by the numeral 90 including an inner portion 92 and an outer portion 94 received on the visor 12 in the same manner. The outer portion 94 is provided with an outer panel 96 and an inner panel 98 with the outer panel 96 having the removable closure 100 defined by the perforated line 102. The panels 96 and 98 extend around the inner edge of the visor 12 and forms inner and outer panels 104 and 106 respectively on the rear portion 92. The free edge of the inner panel 98 is disposed adjacent the free edge of the visor 112 and the outer panel 96 is provided with an extension 108 which extends around the free edge of the visor 12 and overlies and is adhesively secured to the outer surface of the outer panel 106 with this portion of the extension 108 being designated by the numeral 110. Any suitable adhesive may be employed and with this construction, no definite pocket for receiving used tissues is provided although the same could be inserted into the area between the rear portion 92 and the rear or inner surface of the visor 12. This is the simplest form of the invention in that it uses an envelope type of bag similar to the other constructions in which the normal positioning of the adhesive is left on the closure flap which is defined by the extension 108 with the free end of the inner panel 98 providing access for insertion of the tissues and permitting the device to be made upon already available machinery.

Referring now specifically to FIGURES 11 and 12, this modified form of the invention is generally designated by the numeral 112 and includes an inner portion 114 and an outer portion 116. The outer portion 116 includes an outer panel 118 having a free end edge 120 adjacent the free edge of the visor 12. An inner panel 122 is provided which extends to a point coextensive with the free end edge 120 and terminates in a free end edge 124 thus defining a pocket 126 for receiving used tissues or any other refuse. This pocket faces outwardly of the visor for ready access by the driver of a vehicle or a passenger. The other end edges of the panels 118 and 122 are reversely bent and form inner and outer panels 128 and 130 respectively of the inner portion 114. The end edge of the outer panel 130 is free as indicated by the numeral 132 and is disposed adjacent the edge of the visor 12 but slightly spaced outwardly therefrom for rendering the pocket 134 defined thereby more readily accessible. The outer end of the inner panel 128 is reversely bent as indicated by the numeral 136 and extends along and against the inner surface of the inner panel 122 and is adhesively secured thereto with this portion of the extension 136 being designated by the numeral 138. Thus, this form of the invention forms two pockets for receiving refuse, used tissues or the like both of which are readily accessible to the person adjacent to the sun visor. In each instance, the device is constructed of paper or similar inexpensive material rendering itself to well known manufacturing procedures so that the same may be manufactured at an extremely low cost.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An attachment for a sun visor mounted for pivotal movement about the inner edge thereof and comprising a sleeve-like paper member enclosing a substantial portion of the visor and including a portion disposed outwardly of and facing outwardly of the visor and a portion disposed rearwardly of and facing inwardly of the visor, said portion facing outwardly of the visor including an inner and outer panel, said portion facing inwardly of the visor including an inner and outer panel with the inner and outer panels of the inwardly and outwardly facing portions being continuous at the inner edge of the visor, and means connected with one of said portions and extending over and around the free edge of the visor and engaged with the other of the portions for retaining the device mounted on the visor, said means including an extension on the outer panel of the outwardly facing portion, said extension having a free edge adhesively secured to the exterior surface of the inner panel of the inwardly facing portion thereby leaving the end edge of the outer panel of the inwardly facing portion free for defining a pocket between the inner and outer panels thereof.

2. The structure as defined in claim 1 wherein the outer panel of the outwardly facing portion is provided with a perforated line defining a removable closure for exposing a supply of tissue disposed between the inner and outer panels of the outwardly facing portion.

3. An attachment for a sun visor mounted for pivotal movement about the inner edge thereof and comprising a sleeve-like paper member enclosing a substantial portion of the visor and including a portion disposed outwardly of and facing outwardly of the visor and a portion disposed rearwardly of and facing inwardly of the visor, said portion facing outwardly of the visor including an inner and outer panel, said portion facing inwardly of the visor including an inner and outer panel with the inner and outer panels of the inwardly and outwardly facing portions being continuous at the inner edge of the visor, and means connected with one of said portions and extending over and around the free edge of the visor and engaged with the other of the portions for retaining the device mounted on the visor, the outer panel of the outwardly facing portion being provided with an extension folded over and around the free edge of the visor with the free edge of the extension being adhesively secured to the interior surface of the inner panel of the inwardly extending portion thereby constituting said means and leaving both edges of the panels on the inwardly extending portion free for receiving used tissues or other trash between the inner and outer panels thereof.

4. The structure as defined in claim 3 wherein the outer panel of the outwardly facing portion is provided with a perforated line defining a removable closure for exposing a supply of tissue disposed between the inner and outer panels of the outwardly facing portion.

5. An attachment for a sun visor mounted for pivotal movement about the inner edge thereof and comprising a sleeve-like paper member enclosing a substantial portion of the visor and including a portion disposed outwardly of and facing outwardly of the visor and a portion disposed rearwardly of and facing inwardly of the visor, said portion facing outwardly of the visor including an inner and outer panel, said portion facing inwardly of the visor including an inner and outer panel with the inner and outer panels of the inwardly and outwardly facing portions being continuous at the inner edge of the visor, and means connected with one of said portions and extending over and around the free edge of the visor and engaged with the other of the portions for retaining the device mounted on the visor, said means including an extension on the inner panel of the inwardly facing portion extending over and around the free edge of the visor and being adhesively secured to the outer surface of the outer panel of the outwardly extending portion whereby the free edge of the outer panel of the inwardly extending portion defines a pocket between the inner and outer panels thereof.

6. The structure as defined in claim 5 wherein the outer panel of the outwardly facing portion is provided with a preforated line defining a removable closure for exposing a supply of tissue disposed between the inner and outer panels of the outwardly facing portion.

7. An attachment for a sun visor mounted for pivotal movement about the inner edge thereof and comprising a sleeve-like paper member enclosing a substantial portion of the visor and including a portion disposed outwardly of and facing outwardly of the visor and a portion disposed rearwardly of and facing inwardly of the visor, said portion facing outwardly of the visor including an inner and outer panel, said portion facing inwardly of the visor including an inner and outer panel with the inner and outer panels of the inwardly and outwardly facing portions being continuous at the inner edge of the visor, and means connected with one of said portions and extending over and around the free edge of the visor and engaged with the other of the portions for retaining the device mounted on the visor, said means including an extension on the outer panel of the outwardly facing portion extending over and around the free edge of the visor and being adhesively secured to the outer panel of the inwardly extending portion, the outer panel of the outwardly facing portion being provided with a perforated line defining a removable closure for exposing a supply of tissues disposed between the inner and outer panels of the outwardly facing portion.

8. An attachment for a sun visor mounted for pivotal movement about the inner edge thereof and comprising a sleeve-like paper member enclosing a substantial portion of the visor and including a portion disposed outwardly of and facing outwardly of the visor and a portion disposed rearwardly of and facing inwardly of the visor, said portion facing outwardly of the visor including an inner and outer panel, said portion facing inwardly of the visor including an inner and outer panel with the inner and outer panels of the inwardly and outwardly facing portions being continuous at the inner edge of the visor, and means connected with one of said portions and extending over and around the free edge of the visor and engaged with the other of the portions for retaining the device mounted on the visor, said means including an extension on the inner panel of the inwardly facing portion, said extension extending over and around the free edge of the visor and adhesively secured to the inner panel of the outwardly facing portion, the end edges of the outer panels of both portions being free thereby providing two pockets.

References Cited in the file of this patent
UNITED STATES PATENTS

| | | |
|---|---|---|
| 2,148,557 | Hook | Feb. 28, 1939 |
| 2,287,581 | Walker | June 23, 1942 |
| 2,826,334 | Musler | Mar. 11, 1958 |
| 2,908,434 | Schnabel | Oct. 13, 1959 |
| 2,931,114 | Peterson | Apr. 5, 1960 |

FOREIGN PATENTS

| | | |
|---|---|---|
| 204,412 | Australia | Nov. 23, 1956 |